(12) United States Patent
Mizote et al.

(10) Patent No.: US 8,679,638 B2
(45) Date of Patent: Mar. 25, 2014

(54) METHOD OF MANUFACTURING BLADE RUBBER AND WIPER BLADE

(75) Inventors: Norihito Mizote, Kiryu (JP); Hiroaki Saito, Kiryu (JP); Toru Soda, Kiryu (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 256 days.

(21) Appl. No.: 13/055,057

(22) PCT Filed: Jul. 17, 2009

(86) PCT No.: PCT/JP2009/062959
§ 371 (c)(1),
(2), (4) Date: Jan. 20, 2011

(87) PCT Pub. No.: WO2010/010850
PCT Pub. Date: Jan. 28, 2010

(65) Prior Publication Data
US 2011/0119857 A1    May 26, 2011

(30) Foreign Application Priority Data

Jul. 22, 2008  (JP) ................................ 2008-188548

(51) Int. Cl.
*B32B 27/00*    (2006.01)
(52) U.S. Cl.
USPC ......................................................... 428/500
(58) Field of Classification Search
None
See application file for complete search history.

(56) References Cited

U.S. PATENT DOCUMENTS

| | | | |
|---|---|---|---|
| 4,638,525 A | 1/1987 | Sugita et al. | |
| 2003/0233722 A1 | 12/2003 | Sawamura et al. | |
| 2007/0255011 A1 | 11/2007 | Oulie et al. | |
| 2008/0016644 A1* | 1/2008 | Mizote et al. | 15/250.361 |

FOREIGN PATENT DOCUMENTS

| | | |
|---|---|---|
| CN | 101108899 A | 1/2008 |
| JP | 60184531 A | 9/1985 |
| JP | 5239289 A | 9/1993 |
| JP | 6135946 A | 5/1994 |
| JP | 11506071 T | 6/1999 |
| JP | 200417948 A | 1/2004 |
| JP | 2007517085 T | 6/2007 |
| JP | 2008500415 T | 1/2008 |
| JP | 2008024091 A | 2/2008 |
| WO | 9735749 A1 | 10/1997 |
| WO | 2005056356 A1 | 6/2005 |
| WO | 2006128646 A2 | 12/2006 |

OTHER PUBLICATIONS

International search report PCT/JP2009/062959 dated Aug. 10, 2009.
Chinese Office Action and English Translation Chinese received in Chinese Patent Application Serial No. 200980128994.2 dated Jan. 7, 2013.
Chinese Office Action and English Translation received in Chinese Patent Application Serial No. 200980128994.2 dated Aug. 22, 2013.

\* cited by examiner

*Primary Examiner* — Sheeba Ahmed
(74) *Attorney, Agent, or Firm* — McCormick, Paulding & Huber LLP

(57) ABSTRACT

A blade rubber having both of superior durability and wiping performance can be manufactured by using a non-diene-based rubber without environmental burden. A pair of blade-rubber molded bodies molded from the non-diene-based rubber is subjected to an irradiation treatment to generate radical active sites, and monomers are bound by graft polymerization as beginning at the radical active sites. Also, the monomers are adhered on a surface of the blade rubber either before or after the generation of the radical active sites. The irradiation treatment and the graft polymerization may be simultaneously performed or independently performed in this order. In this manner, a surface treatment for reducing friction of the non-diene-based rubber having superior durability can be performed without halogen, and therefore, a blade rubber having superior durability and wiping performance can be manufactured.

22 Claims, 10 Drawing Sheets

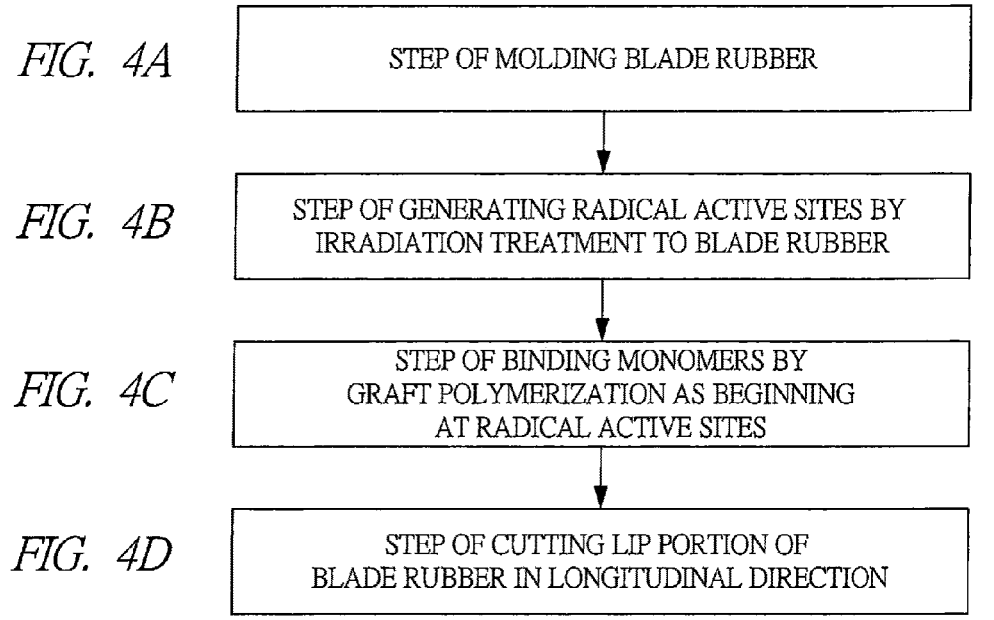
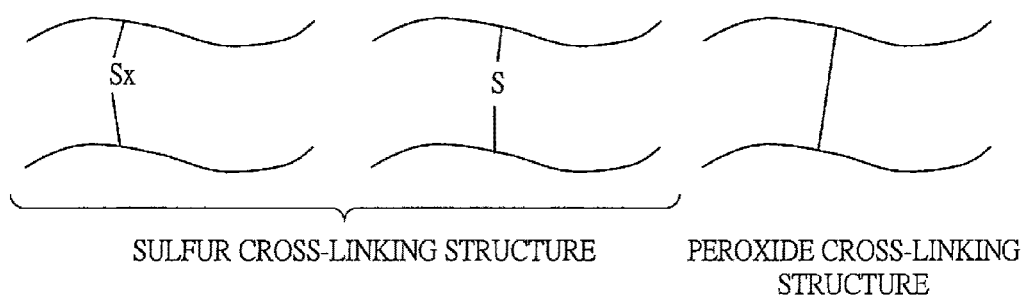

PREVIOUS IRRADIATION TREATMENT

IRRADIATION →  GRAFT POLYMERIZATION

SIMULTANEOUS IRRADIATION TREATMENT

IRRADIATION + GRAFT POLYMERIZATION

ABSORBANCE RATIO : 1720 cm$^{-1}$/1375 cm$^{-1}$

FIG. 12
No.1
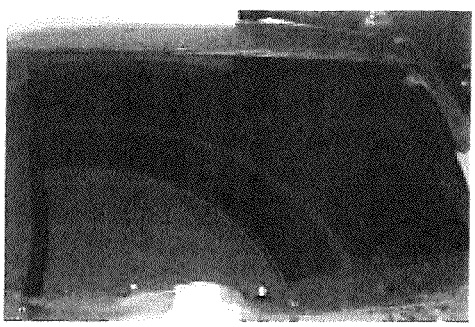
No.2
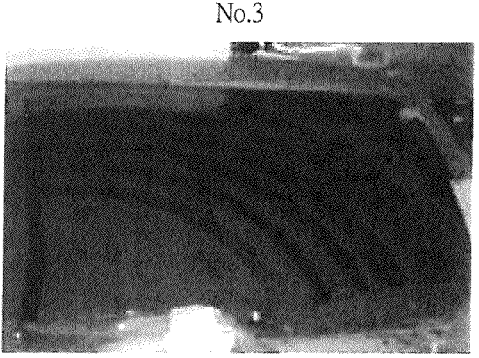
No.3
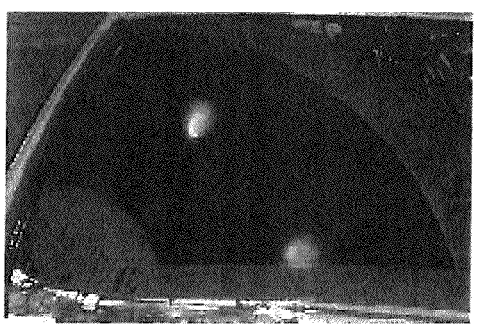
No.4
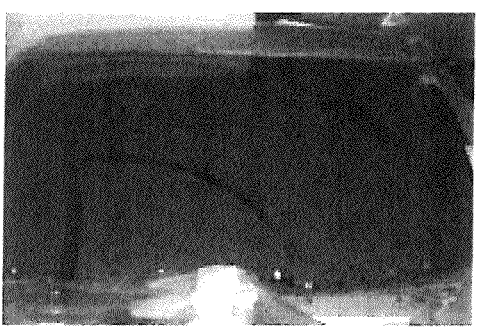
No.5

US 8,679,638 B2

METHOD OF MANUFACTURING BLADE RUBBER AND WIPER BLADE

CROSS REFERENCE TO RELATED APPLICATIONS

This application is entitled to the benefit of and incorporates by reference essential subject matter disclosed in International Patent Application No. PCT/JP2009/62959 filed on Jul. 17, 2009 and Japanese Patent Application No. 2008-188548 filed Jul. 22, 2008.

TECHNICAL FIELD

The present invention relates to a technique for a blade rubber provided in a wiper blade which wipes a windshield of a vehicle, and more particularly, the present invention relates to a technique effectively applied to a blade rubber using a non-diene-based rubber.

BACKGROUND ART

In vehicles such as an automobile, a bus, and a truck, a wiper blade is used in order to ensure driver's view by wiping attachments such as rain, snow, insects, and muddy water splashed by a forward-running vehicle on a windshield such as a front windshield and a rear windshield.

A blade rubber provided in the wiper blade is normally formed such that natural rubber (NR) or a blend (NR/CR) of natural rubber and chloroprene rubber is cross-linked by sulfur. However, the NR has superior durability (low-temperature performance) at a low temperature, but has inferior durability (heat resistance) at a high temperature. The NR/CR has superior heat resistance, but has inferior low-temperature performance. Further, both of the NR and the CR are diene-based rubbers, and therefore, carbon-carbon bond is unstable. Accordingly, the NR and the CR easily react with ozone, oxygen, chemical reagents, and others, and thus the NR and the CR have inferior durability (weather resistance, ozone resistance, and chemical resistance) against weather, ozone, and chemical reagents.

On the other hand, ethylene-propylene-diene terpolimer rubber (EPDM) which is non-diene-based rubber (preferably polymer containing a small content of ethylene, and more particularly, polymer without adding oil or polymer blended with using oil having a low pour point) has superior weather resistance, ozone resistance, or others, and besides, has low-temperature performance equivalent to that of the NR and heat resistance superior to that of the NR/CR, and therefore, has superior durability. However, since the EPDM does not have a double bond in its main chain, there is a problem that its surface cannot be modified by an addition reaction with chlorine. Accordingly, its friction cannot be reduced as low as required for the wiper, and it is difficult to improve its wiping performance to be a practicable level.

Therefore, various techniques for using the EPDM in the blade rubber have been proposed. For example, Patent Documents 1 to 3 propose a multi-color extrusion molding (co-extrusion) in which the EPDM is used for a structure including a neck and the diene-based rubber is used for a lip portion for wiping a glass. Further, for example, Patent Documents 4 and 5 propose a treatment of performing a substitution reaction with halogen to EPDM.

On the other hand, as the method of modifying the rubber surface of the blade rubber, a method of modifying the surface with using an irradiation treatment has been proposed (for example, see Patent Document 6).

PRIOR ART DOCUMENTS

Patent Documents

Patent Document 1: Japanese Patent Application Laid-Open Publication No. S61-35946
Patent Document 2: Japanese Patent Application Laid-Open Publication (Translation of PCT Application) No. H11-506071
Patent Document 3: Japanese Patent Application Laid-Open Publication (Translation of PCT Application) No. 2007-517085
Patent Document 4: Japanese Patent Application Laid-Open Publication No. S60-184531
Patent Document 5: Japanese Patent Application Laid-Open Publication (Translation of PCT Application) No. 2008-500415
Patent Document 6: Japanese Patent Application Laid-Open Publication No. 2008-24091

DISCLOSURE OF THE INVENTION

However, since Patent Documents 1 to 3 propose the multi-color co-extrusion molding, its manufacturing cost is higher than that of the existing extrusion molding, and it is difficult to reflect the superior durability of the EPDM because the lip portion is not made of the EPDM. Since Patent Documents 4 and 5 propose that fluorine having high reactivity needs to be used or chlorine gas needs to be handled at a high temperature, there is a problem that the control of their treatment is difficult. In addition, there is a problem that environmental burden occurs due to halogen.

On the other hand, the proposal of Patent Document 6 does not describe specific effects in a case that the non-diene-based rubber is subjected to the surface modification by the irradiation treatment.

A preferred aim of the invention is to manufacture a blade rubber having both of superior durability and wiping performance with using non-diene-based rubber without environment burden.

In a method of manufacturing a blade rubber according to the present invention, the blade rubber includes: a head portion formed in a cross-sectional rectangular shape; a lip portion contacting a surface of a windshield of a vehicle; and a neck portion connecting the head portion with the lip portion, and the method includes: a step of molding the blade rubber with using a non-diene-based rubber; a step of adhering monomers on at least the lip portion of the molded blade rubber; a step of performing an irradiation treatment to a portion where the monomers are adhered to generate radical active sites on the non-diene-based rubber of a surface of the corresponding portion; and a step of binding the monomers by graft polymerization at the generated radical active sites.

In another method of manufacturing a blade rubber according to the present invention, the blade rubber includes: a head portion formed in a cross-sectional rectangular shape; a lip portion contacting a surface of a windshield of a vehicle; and a neck portion connecting the head portion with the lip portion, and the method includes: a step of molding the blade rubber with using a non-diene-based rubber; a step of adhering monomers on at least the lip portion of the molded blade rubber; and a step of performing an irradiation treatment to a portion where the monomers are adhered to generate radical active sites on the non-diene-based rubber of a surface of the corresponding portion, and simultaneously binding the monomers by graft polymerization at the generated radical active sites.

In still another method of manufacturing a blade rubber according to the present invention, the blade rubber includes: a head portion formed in a cross-sectional rectangular shape; a lip portion contacting a surface of a windshield of a vehicle; and a neck portion connecting the head portion with the lip portion, and the method includes: a step of molding the blade rubber with using a non-diene-based rubber; a step of performing an irradiation treatment to at least the lip portion of the blade rubber to generate radical active sites on the non-diene-based rubber of a surface of the irradiation-treated portion; a step of adhering monomers on a portion where the radical active sites are generated; and a step of binding the monomers by graft polymerization at the generated radical active sites.

In still another method of manufacturing a blade rubber according to the present invention, the blade rubber includes: a head portion formed in a cross-sectional rectangular shape; a lip portion contacting a surface of a windshield of a vehicle; and a neck portion connecting the head portion with the lip portion, and the method includes: a step of molding the blade rubber with using a non-diene-based rubber; a step of performing an irradiation treatment to at least the lip portion of the blade rubber to generate radical active sites on the non-diene-based rubber of a surface of the irradiation-treated portion; and a step of adhering monomers on a portion where the radical active sites are generated and binding the monomers by graft polymerization at the radical active sites on which the monomers are adhered.

In still another method of manufacturing a blade rubber according to the present invention, the blade rubber includes: a head portion formed in a cross-sectional rectangular shape; a lip portion contacting a surface of a windshield of a vehicle; and a neck portion connecting the head portion with the lip portion, and the method includes: a step of molding a blade rubber intermediate, in which a pair of the lip portions are faced with each other, with using a non-diene-based rubber; a step of adhering monomers on at least the lip portion of the molded blade rubber intermediate; a step of performing an irradiation treatment to a portion where the monomers are adhered to generate radical active sites on the non-diene-based rubber of a surface of the corresponding portion; a step of binding the monomers by graft polymerization at the generated radical active sites; and a step of dividing the blade rubber intermediate by cutting the blade rubber intermediate at the lip portions.

In still another method of manufacturing a blade rubber according to the present invention, the blade rubber includes: a head portion formed in a cross-sectional rectangular shape; a lip portion contacting a surface of a windshield of a vehicle; and a neck portion connecting the head portion with the lip portion, and the method includes: a step of molding a blade rubber intermediate, in which a pair of the lip portions are faced with each other, with using a non-diene-based rubber; a step of adhering monomers on at least the lip portion of the molded blade rubber intermediate; a step of performing an irradiation treatment to a portion where the monomers are adhered to generate radical active sites on the non-diene-based rubber of a surface of the corresponding portion and simultaneously binding the monomers by graft polymerization at the generated radical active sites; and a step of dividing the blade rubber intermediate by cutting the blade rubber intermediate at the lip portions.

In still another method of manufacturing a blade rubber according to the present invention, the blade rubber includes: a head portion formed in a cross-sectional rectangular shape; a lip portion contacting a surface of a windshield of a vehicle; and a neck portion connecting the head portion with the lip portion, and the method includes: a step of molding a blade rubber intermediate, in which a pair of the lip portions are faced with each other, with using a non-diene-based rubber; a step of performing an irradiation treatment to at least the lip portion of the blade rubber intermediate to generate radical active sites on the non-diene-based rubber of a surface of the irradiation-treated portion; a step of adhering monomers on a portion where the radical active sites are generated; a step of binding the monomers by graft polymerization at the generated radical active sites; and a step of dividing the blade rubber intermediate by cutting the blade rubber intermediate at the lip portions.

In still another method of manufacturing a blade rubber according to the present invention, the blade rubber includes: a head portion formed in a cross-sectional rectangular shape; a lip portion contacting a surface of a windshield of a vehicle; and a neck portion connecting the head portion with the lip portion, and the method includes: a step of molding a blade rubber intermediate, in which a pair of the lip portions are faced with each other, with using a non-diene-based rubber; a step of performing an irradiation treatment to at least the lip portion of the blade rubber intermediate to generate radical active sites on the non-diene-based rubber of a surface on the irradiation-treated portion; a step of adhering monomers on a portion where the radical active sites are generated and binding the monomers by graft polymerization at the radical active sites on which the monomers are adhered; and a step of dividing the blade rubber intermediate by cutting the blade rubber intermediate at the lip portions.

A wiper blade according to the present invention is a wiper blade for wiping a windshield of a vehicle, and the wiper blade includes: a blade rubber integrally formed with using a non-diene-based rubber and including a head portion formed in a cross-sectional rectangular shape, a lip portion contacting a surface of the windshield of the vehicle, and a neck portion connecting the head portion with the lip portion; and monomers adhered on a surface of the lip portion of the blade rubber and simultaneously bound by graft polymerization at radical active sites formed on the surface of the blade rubber due to performing an irradiation treatment to the blade rubber.

Another wiper blade according to the present invention is a wiper blade for wiping a windshield of a vehicle, and the wiper blade includes: a blade rubber integrally formed with using a non-diene-based rubber and including a head portion formed in a cross-sectional rectangular shape, a lip portion contacting a surface of the windshield of the vehicle, and a neck portion connecting the head portion with the lip portion; and monomers adhered on both side surfaces of a surface of the lip portion of the blade rubber and simultaneously bound by graft polymerization at radical active sites formed on the surface of the blade rubber due to performing an irradiation treatment to the blade rubber.

In the wiper blade according to the present invention, the monomers are polymerizable monomers made of a hydrophobic material containing at least one of a vinyl group ($CH_2$=CH—), an isopropenyl group ($CH_2$=C($CH_3$)—), and an allyl group ($CH_2$=$CHCH_2$—) in molecules.

In the wiper blade according to the present invention, the monomers are polymerizable monomers made of hydrophilic monomers containing at least one of 2-hydroxyethyl methacrylate (HEMA), 2-hydroxyethyl acrylate (HEA), glycidyl methacrylate (GMA), acrylamide, methacrylic acid, acrylic acid, and their metal salt.

In the wiper blade according to the present invention, the non-diene-based rubber is made of ethylene-propylene-diene terpolymer rubber (EPDM).

In the wiper blade according to the present invention, the non-diene-based rubber is formed by peroxide cross-linking.

In the wiper blade according to the present invention, the Martens hardness in the surface of the lip portion is 5 N/mm$^2$ or harder.

In the wiper blade according to the present invention, the monomers are not adhered on a tip surface of the lip portion of the blade rubber.

In the wiper blade according to the present invention, a content of ethylene contained in the ethylene-propylene-diene terpolymer rubber (EPDM) polymer is 62 mol % or less.

In the wiper blade according to the present invention, a content of ethylene contained in the ethylene-propylene-diene terpolymer rubber (EPDM) polymer is 50 mol % or more and 60 mol % or less.

In the wiper blade according to the present invention, a modulus of tensile elasticity of the lip portion at an atmospheric temperature of −20° C. to 20° C. is 170% or lower.

In the wiper blade according to the present invention, a modulus of tensile elasticity of the lip portion at an atmospheric temperature of −20° C. to 20° C. is 100% or higher and 160% or lower.

In the wiper blade according to the present invention, oil is added, and a fluid point of the oil is −20° C. or lower.

In the wiper blade according to the present invention, oil is added, and a fluid point of the oil is −30° C. or lower.

According to the present invention, a blade rubber is molded with using a non-diene-based rubber, radical active sites are generated on at least a lip portion due to performing an irradiation treatment, and monomers are bound by graft polymerization as beginning at the radical active sites, and therefore, a surface treatment without halogen by which friction of the non-diene-based rubber having superior durability is reduced as low as being a practicable level for a wiper can be achieved.

In this manner, a blade rubber having superior durability and wiping performance can be manufactured with using a non-diene-based rubber without environmental burden.

BRIEF DESCRIPTIONS OF THE DRAWINGS

FIGS. 4A to 4D are schematic flow charts schematically illustrating a procedure of a method of manufacturing the blade rubber according to the present invention;

FIG. 5 is a schematic explanatory diagram schematically explaining a difference in a cross-linking structure;

FIG. 12 is pictures of a blade rubber after evaluation of low-temperature wiping performance.

BEST MODE FOR CARRYING OUT THE INVENTION

Figure 1:
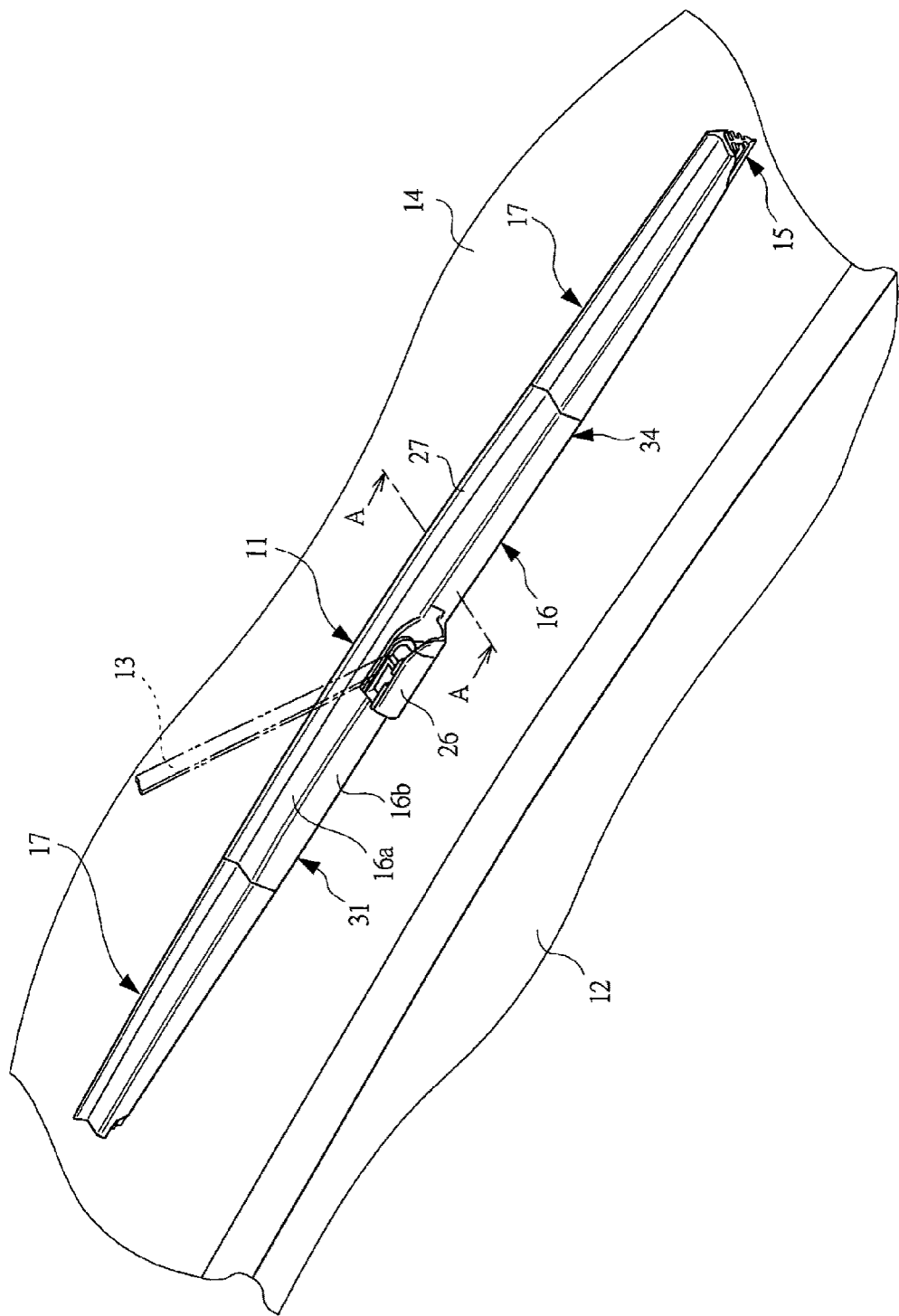
FIG. 1 is a perspective view illustrating a wiper blade in which a blade rubber according to an embodiment of the present invention is provided.

Hereinafter, an embodiment of the present invention will be described in detail. FIG. 1 is a perspective view illustrating a wiper blade in which a blade rubber according to an embodiment of the present invention is provided, FIG. 2 is a cross-sectional view taken along line A-A of FIG. 1, and FIGS. 3A and 3B are explanatory views illustrating a detail of a holding portion illustrated in FIG. 1.

As illustrated in FIG. 1, a wiper blade 11 is attached to a tip portion of a wiper arm 13 of a vehicle 12, and wipes a front windshield 14 (hereinafter, referred to as a windshield 14) of the vehicle 12 as swinging together with the wiper arm 13 when the wiper arm 13 is swung by driving a wiper motor which is not illustrated.

The wiper blade 11 includes: a blade rubber 15 directly contacting the windshield 14; and a rubber holder 16 holding the blade rubber 15, and a pair of covers 17 is provided on both sides of the rubber holder 16 in a longitudinal direction.

Figure 2:
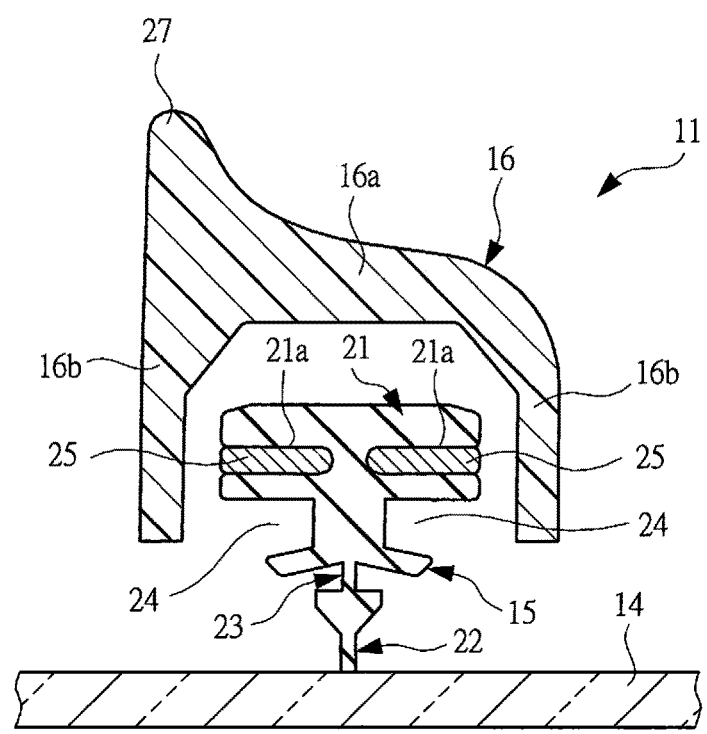
FIG. 2 is a cross-sectional view taken along line A-A of FIG. 1.
Figure 3A:
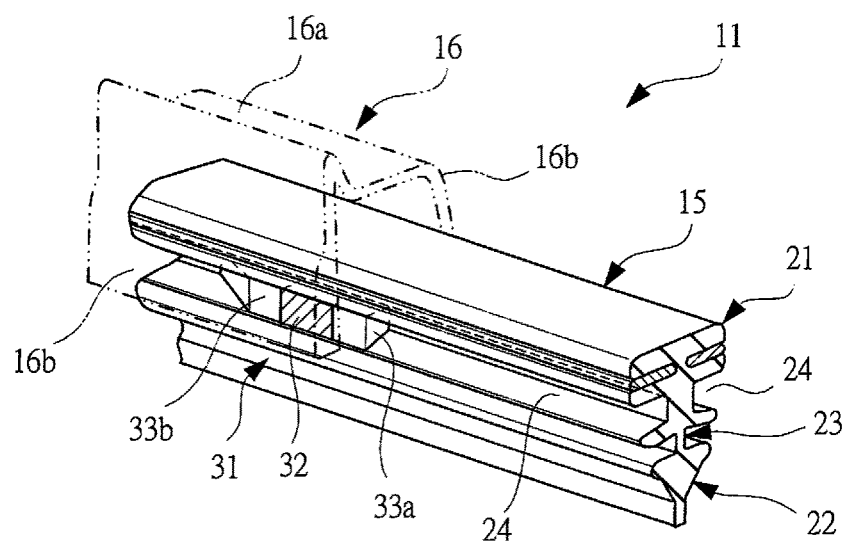
FIGS. 3A and 3B are explanatory views illustrating a detail of a holding portion illustrated in FIG. 1.
Figure 3B:
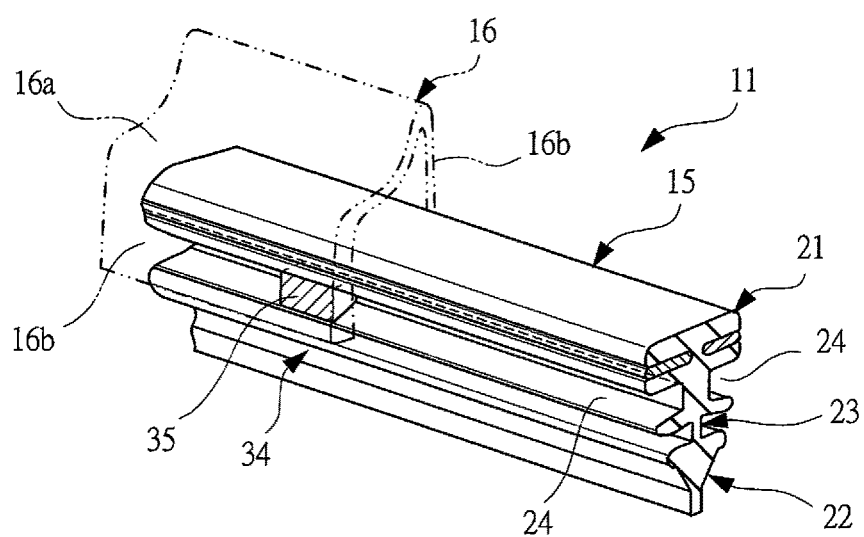

As illustrated in FIG. 2, the blade rubber 15 includes: a head portion 21 having a cross-sectional rectangular shape; a lip portion 22; and a neck portion 23, is formed in a bar shape having a substantially uniformed cross-sectional surface in a longitudinal direction, and is formed to contact a surface of the windshield 14 at the lip portion 22. The neck portion 23 is formed so that a width in a wiping direction is narrower than those of the head portion 21 and the lip portion 22, and therefore, the lip portion 22 is tiltably jointed to the head portion 21 in the wiping direction.

A holding groove 24 having opening portions on both side surfaces in the wiping direction and extending in the longitudinal direction is formed between the head portion 21 and the neck portion 23. Further, on each of both side surfaces of the head portion 21, an attachment groove 21a is formed so as to extend in the longitudinal direction. And, a plate spring member 25 is attached to each of the attachment grooves 21a.

The plate spring member 25 is formed in a plate shape having the same length as that of the blade rubber 15 by performing a stamping process to a plate material such as a steel sheet, and is elastically deformable in a direction perpendicular to the windshield 14. That is, the blade rubber 15 to which the plate spring member 25 is attached is elastically deformable together with the plate spring member 25 in a direction perpendicular to the windshield 14, that is a direction where a curvature magnitude varies. Further, in a natural state, the plate spring member 25 is significantly curved toward the elastically deformable direction as much as its curvature is larger than that of the windshield 14. Accordingly, in a state that the blade rubber is away from the windshield 14, the blade rubber 15 to which the plate spring member 25 is attached is also curved more than the windshield 14.

Note that the plate spring member 25 is made of a steel sheet in the figures. However, the material is not limited to this, and may be a material elastically deformable in the direction perpendicular to the windshield 14 such that the plate spring member is made of a rigid resin or others.

The rubber holder 16 is made of a resin material, and is formed in a cross-sectional U shape so as to include: a top wall portion 16a extending in the longitudinal direction; and a pair of side wall portions 16b extending from both sides of the top wall portion 16a toward the windshield 14, and has a length which is almost half the length of the blade rubber 15. A center portion of the blade rubber 15 is disposed inside the rubber holder 16, the blade rubber is covered by the rubber holder 16, and only the lip portion 22 is exposed outside. Further, as illustrated in FIG. 1, the attachment portion 26 is fixed to a substantially center portion of one wall portion 16b in the longitudinal direction, and the rubber holder 16 is attached to the tip portion of the wiper arm 13 at the attachment portion 26. Still further, a fin 27 is integrally formed with the top wall portion 16a, and aerodynamic characteristics of the wiper blade 11 are improved by the fin 27.

As illustrated in FIG. 1, a holding portion 31 is provided on one side of the rubber holder 16 in the longitudinal direction (on a closer side to a swinging center of the wiper arm 13 when the wiper blade 11 is attached to the wiper arm 13). As illustrated in FIG. 3A, the holding portion 31 includes a pair of holding hooks 32 (the figure illustrates only one side, but the same holding hook is also provided on the other side). Each of these holding hooks 32 is formed in a cross-sectionally protruding rectangular shape which is perpendicular to the longitudinal direction of the blade rubber 15, is parallel to the wiping direction, and is protruded from the side wall portion 16b, and each of these holding hooks holds the blade rubber 15 so as to be engaged with each holding groove 24. Further, a pair of stopper portions 33a and 33b sandwiching each holding hook 32 therebetween in the longitudinal direction is provided in the blade rubber 15, so that movement of the holding hook 32 in the direction along the holding groove 24 is limited with respect to the blade rubber 15 by these stopper portions 33a and 33b. That is, the blade rubber 15 is held by the rubber holder 16 as being positioned at the holding portion 31 in the longitudinal direction.

Similarly, a holding portion 34 is provided on the other end of the rubber holder 16 in the longitudinal direction. As illustrated in FIG. 3B, the holding portion 34 includes a pair of holding hooks 35 (the figure illustrates only one side, but the same holding hook is also provided on the other side) each shaped as having a rectangular cross-sectional surface, and these holding hooks 35 are engaged with the holding groove 24 to hold the blade rubber 15. In addition, the stopper portion is not provided in the blade rubber 15 at the portion where the holding hook 35 is engaged, so that the holding hook 35 is movable along the holding groove 24. That is, the blade rubber 15 is held so as to be movable at the holding portion 34 with respect to the rubber holder 16 in a shaft direction.

In this manner, in the wiper blade 11, the pair of holding portions 31 and 34 are provided on both ends of the rubber holder 16 in the longitudinal direction, and the blade rubber 15 is held at two points of these holding portions 31 and 34. Accordingly, when a pressing force is applied from the wiper arm 13 to the rubber holder 16 via the attachment portion 26, the pressing force is applied from two points on both ends of the rubber holder 16, that is each of the holding portions 31 and 34, to the blade rubber 15, so that the blade rubber 15 is elastically contacted the windshield 14.

Next, a method of manufacturing the blade rubber according to the present invention is described. FIGS. 4A to 4D are schematic flow charts schematically illustrating a procedure of the method of manufacturing the blade rubber according to the present invention. As illustrated in FIGS. 4A to 4D, the above-described blade rubber 15 is manufactured through a step of forming the blade rubber, a step of generating radical active sites on the blade rubber by performing an irradiation treatment, a step of binding monomers by graft polymerization as beginning at the radical active sites, and a step of cutting the lip portion of the blade rubber in the longitudinal direction.

In the step illustrated in FIG. 4A, as a rubber used for forming the blade rubber, non-diene-based rubber is used because of having superior durability. As the non-diene-based rubber, there may be used, for example, ethylene-propylene-diene terpolymer rubber (EPDM), ethylene-propylene copolymer rubber (EPR), fluorocarbon rubber (FKM), butyl rubber (IIR), silicon rubber, epichlorohydrin rubber (CO, ECO), urethane rubber (U), acrylic rubber (ACM), or others. In addition, there may be used the one in which a predetermined amount of non-diene-based rubber is compounded with natural rubber (NR) or a blend (NR/CR) of natural rubber and chloroprene rubber, the one in which a predetermined amount of non-diene-based rubber is blended with ester-based urethane rubber, or the one in which a predetermined amount of a plurality of types of non-diene-based rubbers is blended with each other.

The ethylene-propylene-diene terpolymer rubber (EPDM) and the ethylene-propylene copolymer rubber (EPR) of these non-diene-based rubbers are preferable because their surfaces are easily modified without developing a decomposition reaction due to the irradiation treatment. Further, from a viewpoint of obtaining superior performance of the wiper blade, ethylene-propylene-diene terpolymer rubber (EPDM) is particularly preferable because of lightest weight among the generally-known rubbers.

Here, EPDM is generally classified as a rubber having superior low-temperature performance, and has low-temperature performance superior to that of chloroprene rubber (CR) and equivalent to that of natural rubber (NR). However, when EPDM is considered as a wiper product, the wiping performance at low temperature even in the EPDM is significantly changed depending on its composition. This is because of the influence of low-temperature crystallization of an ethylene component of EPDM polymer and low-temperature solidification of an additive oil component. For this reason, EPDM polymer containing a small content of ethylene is used as the EPDM, and no oil is added to the EPDM or oil having a low fluid point is blended, so that the EPDM blade rubber having superior low-temperature wiping performance can be obtained.

Specifically, the content of ethylene polymer contained in the EPDM is preferably 62 mol % or less, and is more preferably 60 mol % or less. Note that the EPDM normally contains 50 mol % or more of ethylene. A modulus of tensile elasticity of EPDM in temperature change from 20° C. to −20° C. is preferably 170% or less, and is more preferably 160% or less. The modulus of tensile elasticity can be measured based on, for example, JIS K6251 standard. As the oil component to be added to the EPDM, its fluid point is preferably −20° C. or lower, more preferably −30° C. or lower, and particularly preferably −45° C. or lower. The fluid point of the oil can be measured based on, for example, JIS K2269 standard. Note that, in consideration of practical benefits and costs, a lower limit of the fluid point of the oil is preferably about −50° C.

These non-diene-based rubbers are blended with generally-known additives such as a vulcanizing agent (crosslinker), a vulcanization accelerator auxiliary agent, a softener, an antioxidant, a filler, a silane coupling agent, silica, and carbon black (strengthening agent), and are molded into the blade rubber through a conventionally already-known method such as press molding.

As a method for vulcanization (cross-linking), the peroxide cross-linking is preferable from a viewpoint of superior permanent deformation characteristics. FIG. 5 is a schematic explanatory diagram schematically illustrating a difference in a cross-linking structure.

As illustrated in FIG. 5, in the sulfur cross-linking, there is provided a cross-linking structure having monosulfide or polysulfide bond in which polymer chains are linked to each other by one or plural sulfur atoms, respectively. On the other hand, in the peroxide cross-linking, there is provided a cross-linking structure in which polymer chains are directly linked to each other by covalent bond. That is, in the peroxide cross-linking structure in which the polymer chains are directly linked to each other by covalent bond, the structure becomes rigid, and therefore, molecular relaxation behavior is suppressed. Since the permanent deformation behavior of rubber is influenced by relaxation phenomena of the rubber molecular structure, the permanent deformation is suppressed by peroxides.

For example, as shown in Table 1, when the permanent deformation is measured under a predetermined condition, in a case of the peroxide cross-linking of EPDM, the permanent deformation can be suppressed to less than 1/10 of that in a case of the sulfur cross-linking of the natural rubber (NR).

TABLE 1

| | TYPE OF RUBBER | CROSS-LINKING METHOD | PERMANENT DEFORMATION |
|---|---|---|---|
| COMPARATIVE EXAMPLE | NR | SULFUR | 17% |
| COMPARATIVE EXAMPLE | NR | PEROXIDE | 12% |
| EXAMPLE | EPDM | PEROXIDE | 1.5% |

80° C. × 45 h × 100% tension
JIS No. 3 Dumbbell (marked line 20 mm)
Permanent deformation = ("marked-line distance after test" − "initial marked-line distance")/"initial marked-line distance" × 100

Further, since the peroxide cross-linking structure has higher dissociation energy than the sulfur cross-linking structure and has higher resistance against heat or others than the sulfur cross-linking structure, it has also superior deterioration resistance. Note that, in addition to the peroxide cross-linking method, a linking method employing a cross-linking structure in which the polymer chains are linked to each other by covalent bond has also the same effects as that of the peroxide cross-linking method.

As the peroxide cross-linking agent for cross-linking the non-diene-based rubber, there are 1,3-bis(tertiary-butyl peroxy isopropyl)benzene, 2,5-dimethyl-2,5-di(tertiary-butyl peroxy) hexine-3, di-cumyl peroxide, 2,4-dichloro benzoyl peroxide, benzoyl peroxide, 1,1-di-(tert.-butyl peroxy)-3,3, 5-trimethyl cyclohexane, 2,5-dimethyl-2,5-dibenzoyl peroxy hexane, n-butyl-4,4-di(tert.-butyl peroxy)valerate, tert.-butyl peroxy benzoate, di(tert.-butyl peroxy)diisopropyl benzene, tert.-butyl cumyl peroxide, 2,5-dimethyl-2,5-di(tert.-butyl peroxy)hexane, di(tert.-butyl) peroxide, 2,5-dimethyl-2,5-di (tert.-butyl peroxy)hexine-3, and others. As these peroxide cross-linking agents, one single type of them may be used or mixture of two types or more of them may be used.

As the irradiation treatment for generating radical active sites in the blade rubber molded in the step illustrated in FIG. 4B, there are, for example, electron beam irradiation treatment, ultraviolet irradiation treatment, plasma irradiation treatment, ray (α-ray, β-ray, and γ-ray) irradiation treatment, ion beam irradiation treatment, corona discharge irradiation treatment, and others. Among them, the electron beam irradiation treatment is particularly preferable from a viewpoint of high treatment efficiency or others. By performing such an irradiation treatment, the radical active sites are generated in the blade rubber, and graft polymerization reaction proceeds as beginning at the radical active sites in the step illustrated in FIG. 4C.

Figure 6A:
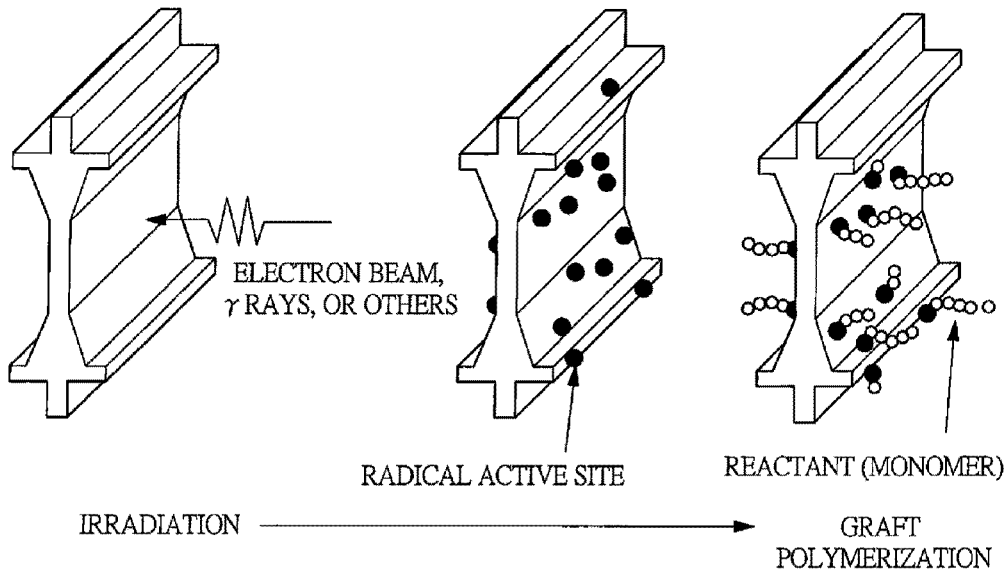
FIGS. 6A and 6B are explanatory diagrams illustrating a reaction mode in each irradiation treatment.
Figure 6B:
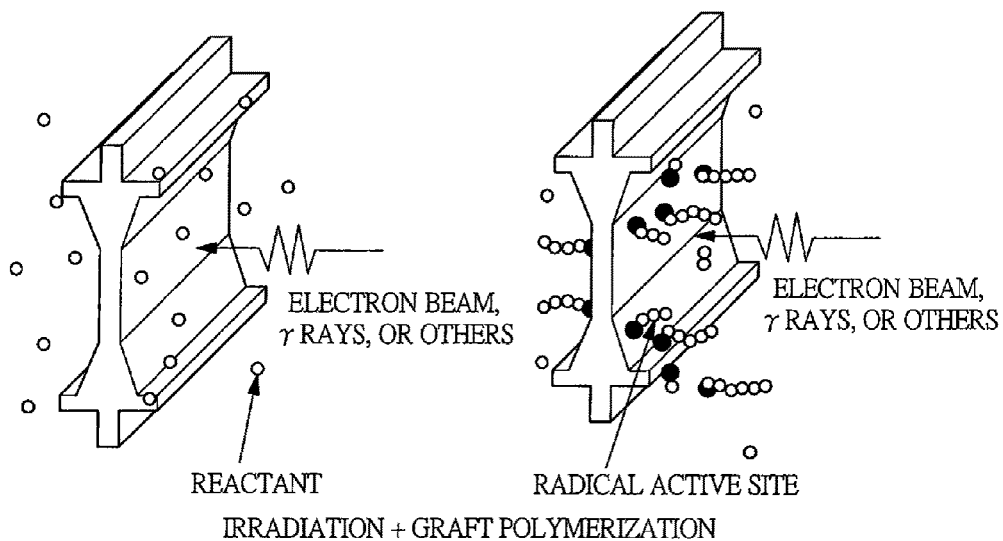

FIGS. 6A and 6B are explanatory diagrams illustrating a reaction mode of each irradiation treatment. Note that FIGS. 6A and 6B illustrate a state before the blade rubber is cut, that is only the lip portion of the blade rubber molded so that the lip portions of the pair of blade rubbers are faced with each other. As illustrated in FIGS. 6A and 6B, as the irradiation treatment for accelerating the graft polymerization reaction as beginning at the generated radical active sites, two methods are cited.

In the treatment illustrated in FIG. 6A, the radical active sites are generated by irradiating electron beam or others to a rubber, and then, through a step of adhering monomers on a surface of the blade rubber, the monomers are bound by the graft polymerization, that is a previous irradiation treatment that the radical active sites are generated by a previous irradiation treatment. In the previous irradiation treatment, it is preferable to perform both of the irradiation treatment and the graft polymerization reaction under a nitrogen atmosphere. An absorbed dose in the previous irradiation treatment is preferably 50 to 500 kGy in a deoxygenated state.

The treatment illustrated in FIG. 6B is a simultaneous irradiation treatment that the generation of the radical active sites and the graft polymerization are simultaneously performed. In the simultaneous irradiation treatment, for example, through a step of adhering monomers used for the graft polymerization to the surface of the blade rubber by coating or dipping, the above-described irradiation with the electron beam or others for generating the radical active sites is performed. An absorbed dose in the simultaneous irradiation treatment is preferably 10 to 200 kGy.

The graft polymerization can be performed by a generally-known method, and either of a hydrophobic material and a hydrophilic material may be used as a polymerizable monomer used for the graft polymerization. As the hydrophobic material, there is a compound which is a polymerizable monomer having at least one of a vinyl group ($CH_2$=CH—), an isopropenyl group ($CH_2$=C($CH_3$)—), and an allyl group ($CH_2$=CHCH$_2$—) in molecules, and has a hydrophobic structure such as a hydrocarbon group, organosilicon group, or fluorocarbon group or has a functional group providing hydrophobic property by a secondary reaction after the graft polymerization, at its molecular end.

As such a hydrophobic material, there are, for example, ethyl methacrylate, vinyl methacrylate, styrene, cyclohexyl methacrylate, dodecyl methacrylate, ethyl acrylate, vinyl acrylate, cyclohexyl acrylate, dodecyl acrylate, trimethylsilyl methacrylate, trimethoxysilyl propyl methacrylate, 3-(methacryloyloxy)propyl tris(trimethylsiloxy)silane, trimethylsilyl acrylate, trimethoxysilyl propyl acrylate, 3-(acryloyloxy) propyl tris-(trimethylsiloxy)silane, 1H, 1H, 3H-tetrafluoropropyl methacrylate, 2,2,2-trifluoroethyl methacrylate, 2-(perfluorobutyl)ethyl methacrylate, 1H, 1H, 3H-tetrafluoropropyl acrylate, 2,2,2-trifluoroethyl acrylate, 2-(perfluorobutyl)ethyl methacrylate, their derivatives, and others. In these hydrophobic monomers, one single type of them or a mixture of two or more types thereof may be used.

As the hydrophilic material, there are, for example, 2-hydroxyethyl methacrylate (HEMA), 2-hydroxyethyl acrylate (HEA), glycidyl methacrylate (GMA), acrylamide, methacrylic acid, acrylic acid, their metal salts, and others. In these hydrophilic monomers, one single type of them or a mixture of two or more types thereof may be used.

The above-described blade rubber is manufactured as a pair of blade-rubber molded bodies (blade-rubber intermediate bodies) which is formed so that the lip portions are faced with each other. And, the pair of the blade-rubber molded bodies are cut at the lip portions in the longitudinal direction in the step illustrated in FIG. 4D, so that the blade rubber is manufactured.

Figure 7A:
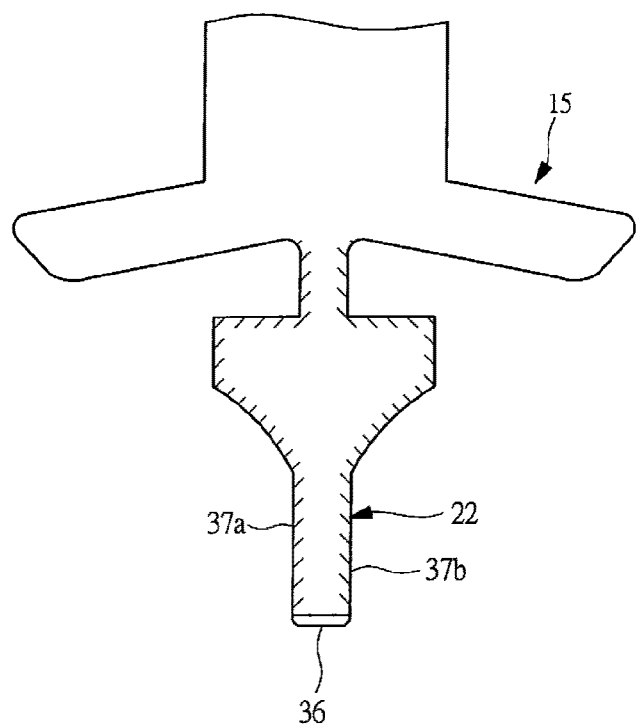
FIG. 7A is an enlarged view illustrating a state that monomers are adhered only on a lip portion illustrated in FIG. 2.
Figure 7B:
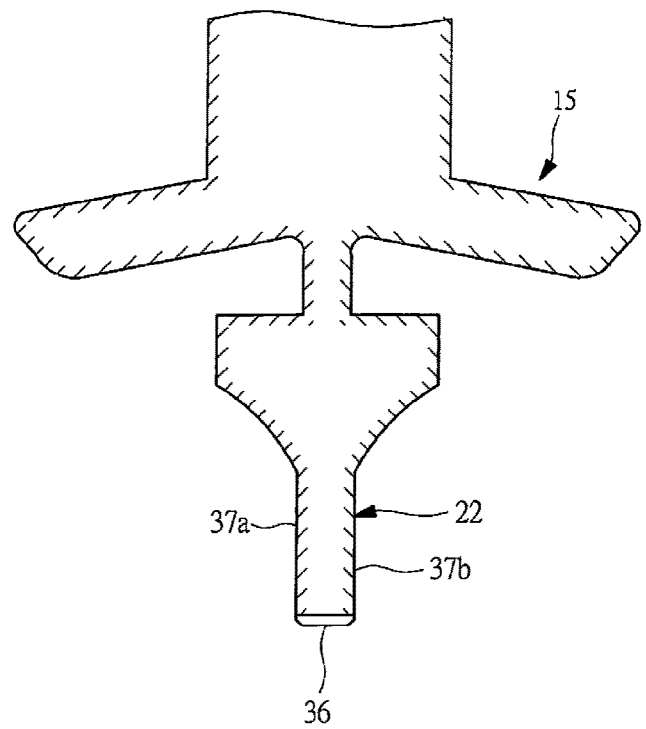
FIG. 7B is an enlarged view illustrating a state that monomers are entirely adhered on a blade rubber illustrated in FIG. 2.

FIG. 7A is an enlarged view illustrating a state that monomers are adhered only on the lip portion illustrated in FIG. 2, and FIG. 7B is an enlarged view illustrating a state that monomers are entirely adhered on the blade rubber illustrated in FIG. 2. Note that, in FIGS. 7A and 7B, portions where the monomers are bound are illustrated with the dashed line. Since the pair of rubber molded bodies are cut with the state that the graft-polymerized monomers are adhered, the monomers are not adhered on a cutting surface (tip surface) 36 of the blade rubber as illustrated in FIGS. 7A and 7B. Generally, in the blade rubber 15, the windshield is wiped by an edge portion which is a boundary between both side surfaces 37a and 37b of the lip portion 22 and the cutting surface 36, and therefore, the windshield can be wiped by the both side surfaces 37a and 37b on which the monomers are adhered, and the windshield cannot be wiped by the cutting surface 36 on which the monomers are not adhered. In addition, to a portion not contacted with the windshield such as a head portion of the blade rubber, the irradiation for generating the radical active sites with using the electron beam or others and the graft polymerization may not be performed. Accordingly, a masking may be previously performed on a portion to which the electron beam or others is not to be irradiated, and the electron beam or others may be irradiated only onto a necessary portion such as the lip portions 22 of the blade-rubber molded bodies as exemplified in FIGS. 7A and 7B.

As described above, in the present invention, the surface modification for modifying the surface of the blade rubber is performed by performing the irradiation treatment to the surface of the blade rubber to generate the radical active sites and binding the monomers by the graft polymerization as beginning at the radical active sites, and therefore, the surface friction of the rubber may be reduced even in the non-diene-based rubber similarly to the diene-based rubber whose surface is treated by chlorine.

That is, in the non-diene-based rubber, the surface treatment by chlorine cannot be performed in spite of having the superior durability at both of low temperature and high temperature and the superior durability against weather, ozone, and chemical reagents to that of the diene-based rubber because of low reactivity with heat, water, ultraviolet rays, ozone, oxygen, chemical reagents, and others. Thus, it has been difficult to manufacture a blade rubber whose chatter vibration or others is reduced and which can wipe with good visibility by using only the non-diene-based rubber. However, in the present invention, the surface treatment for low friction can be performed to the non-diene-based rubber, and therefore, a blade rubber having superior durability and wiping performance can be obtained. Further, the surface treatment can be performed without halogen, and therefore, the blade rubber can be manufactured without the environmental burden.

In the foregoing, the invention made by the present inventors has been concretely described based on the embodiments. However, it is needless to say that the present invention is not limited to the foregoing embodiments and various modifications and alterations can be made within the scope of the present invention.

For example, in the present embodiment, the blade rubber 15 is manufactured as the pair of blade-rubber molded bodies formed so that the lip portions 22 are faced with each other, and the blade rubber 15 is formed by cutting the pair of blade-rubber molded bodies at the lip portions 22 in the longitudinal direction. However, the formation is not limited this, and the blade rubbers 15 may be previously individually molded to omit the cutting step.

Further, in the present embodiment, the wiper blade 11 wipes the front windshield 14 of the vehicle 12. However, the wiping is not limited this, and the wiper blade may wipe a rear windshield or others of the vehicle 12.

Still further, in the present embodiment, the plate spring member 25 is attached to the attachment groove 21a of the blade rubber 15. However, the attachment is not limited this, and the plate spring member 25 may be directly fixed to the blade rubber 15 by adhesion or others.

Moreover, the present invention can be applied to a wiper blade used in various-type wiper devices such as a tandem-type wiper device and an opposed-type wiper device.

Example

Hereinafter, the present invention will be described in more detail based on Examples.

Experiment 1

Verification of Friction Reduction Effect by Irradiation Treatment

With 100 phr of EPDM which is the non-diene-based rubber, 5 phr of a peroxide cross linker, 5 phr of zinc oxide, 2 phr of stearic acid, 1 phr of a vulcanization accelerator auxiliary agent, and 50 phr of carbon black were mixed, and the pair of blade-rubber molded bodies were molded by press molding. The blade-rubber molded bodies were dipped into aqueous solution of 50 weight % HEMA, and were subjected to the simultaneous irradiation treatment at a temperature of 25° C. with 10 kGy of electron beam as illustrated in FIG. 6B (the generation of the radical active sites by the electron beam irradiation and the graft polymerization of HEMA were simultaneously performed). The micro Martens hardness ($N/mm^2$) of the blade-rubber molded bodies obtained after the treatment was measured in conformity with IS014577-1 by a dynamic ultra micro hardness tester manufactured by Shimadzu Corporation.

Further, also in example that each of the pair of blade-rubber molded bodies molded from EPDM and NR was subjected to the chlorine treatment instead of the simultaneous irradiation, the micro Martens hardness ($N/mm^2$) was measured similarly to the example that the blade-rubber molded bodies were subjected to the simultaneous irradiation treatment. Still further, also in a non-treatment example that the blade rubber molded from EPDM was not subjected to any treatment, the micro Martens hardness ($N/mm^2$) was measured similarly to the example that the blade-rubber molded bodies were subjected to the simultaneous irradiation treatment. As these results, FIG. 8 illustrates the example (example of EPDM graft polymerization) that the blade-rubber molded bodies molded from EPDM were subjected to the simultaneous irradiation treatment as "Practical Example", and other examples as "Comparative Examples".

Figure 8:
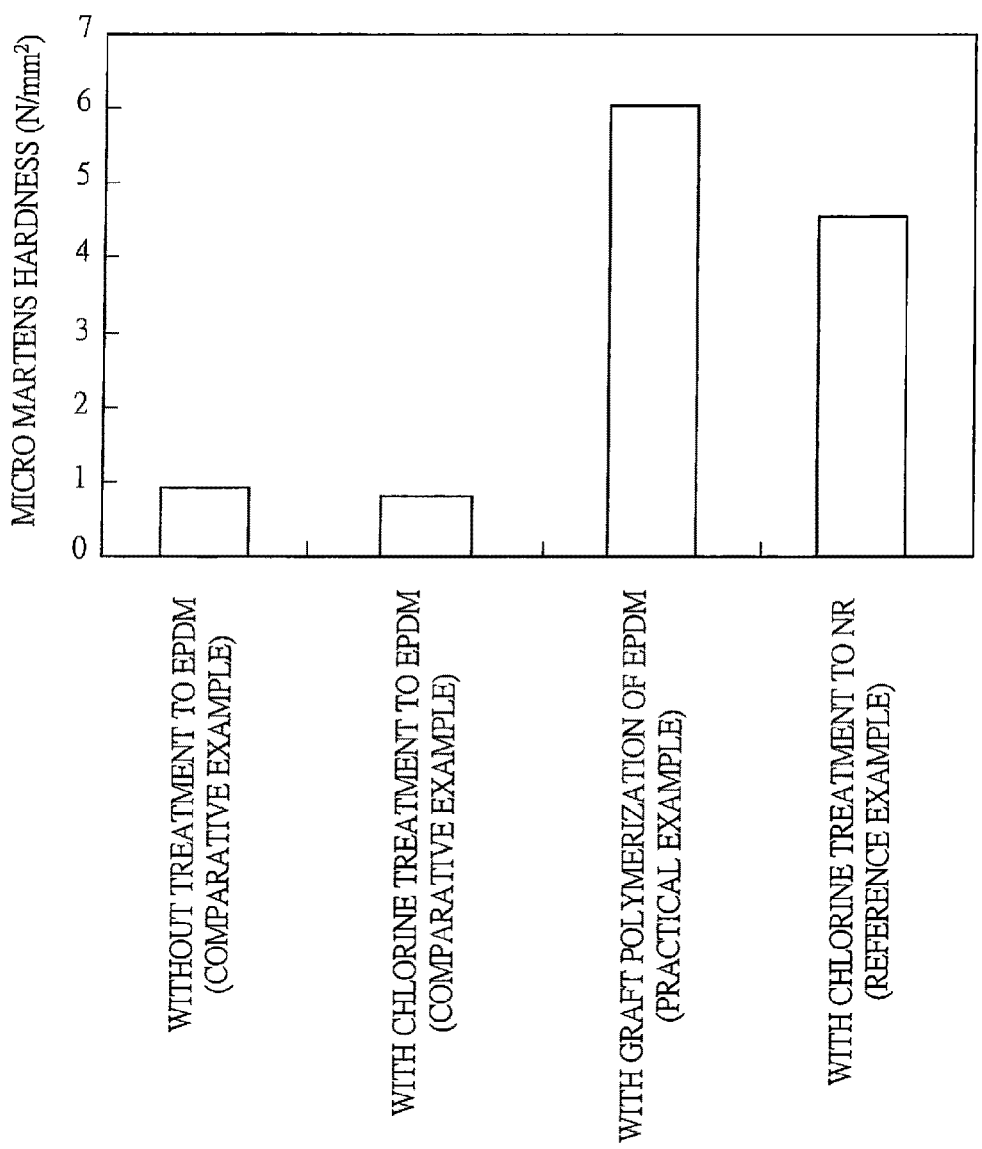
FIG. 8 is a graph illustrating a confirmatory result of a friction reducing effect by irradiation treatments in Experiment 1.

As illustrated in FIG. 8, even when the blade-rubber molded bodies molded from EPDM was subjected to the general chlorine treatment, the rubber surface did not become hard. However, when the EPDM was subjected to the irradiation with electron beam to cause the graft polymerization of HEMA, its micro Martens hardness was improved by about four over three times of the hardness of the example of the chlorine-treated NR. That is, it was found out that, when the blade-rubber molded bodies molded from EPDM was subjected to the simultaneous irradiation treatment, its hardness of the rubber surface could be improved equivalent to or more than that of the case that the blade-rubber molded bodies molded from NR was subjected to the chlorine treatment.

Experiment 2

Verification of Progress Degree of Surface Modification

A progress degree of the surface modification obtained by the simultaneous irradiation treatment to the blade-rubber molded bodies molded from EPDM in the above-described Experiment 1 was verified by studying a relationship between an absorbance ratio ($1720\ cm^{-1}/1375\ cm^{-1}$) obtained from a total reflection measuring method (FT/IR analytical system called Attenuated Total Reflection: ATR-FT/IR) and the micro Martens hardness of the rubber surface. The result is illustrated in FIG. 9.

Figure 9:
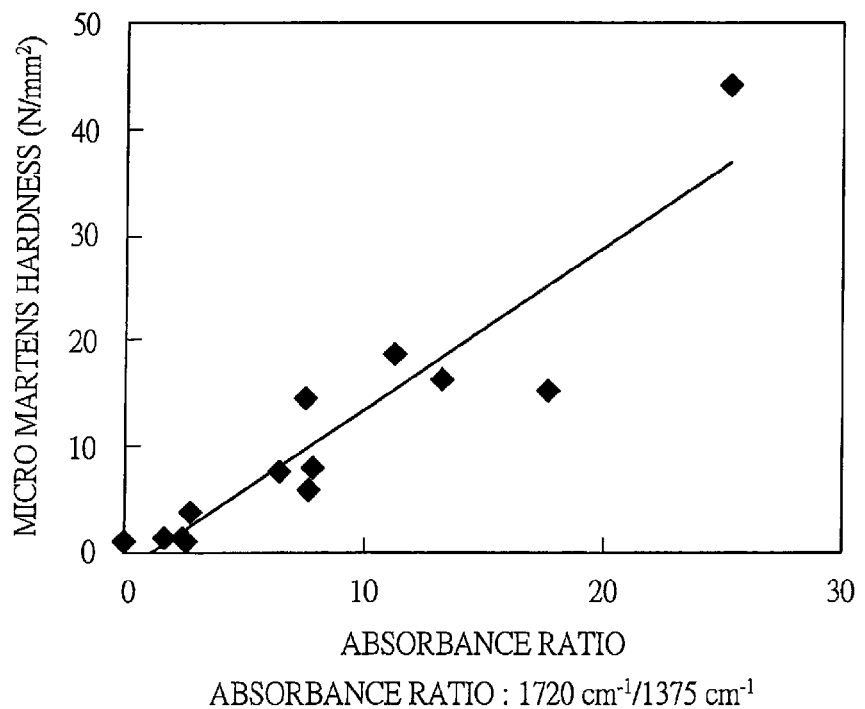
FIG. 9 is a graph illustrating a relationship between micro martens hardness and absorbance ratio in Experiment 2.

As illustrated in FIG. 9, the micro Martens hardness tended to be increased as increasing the absorbance ratio. That is, it was found out that the micro Martens hardness can be increased by the graft polymerization of HEMA by the electron beam irradiation.

Experiment 3

Verification of Correlation Between Micro Martens Hardness and Friction Coefficient In the simultaneous irradiation treatment to the blade-rubber molded bodies molded from EPDM in the above-described Experiment 1, the correlation between the micro Martens hardness and the friction coefficient was verified from a result of measuring frictional force of a target base material when the micro Martens hardness is varied. The result is illustrated in a graph of FIG. 10. Note that the frictional force was measured under the following conditions.

Figure 10:
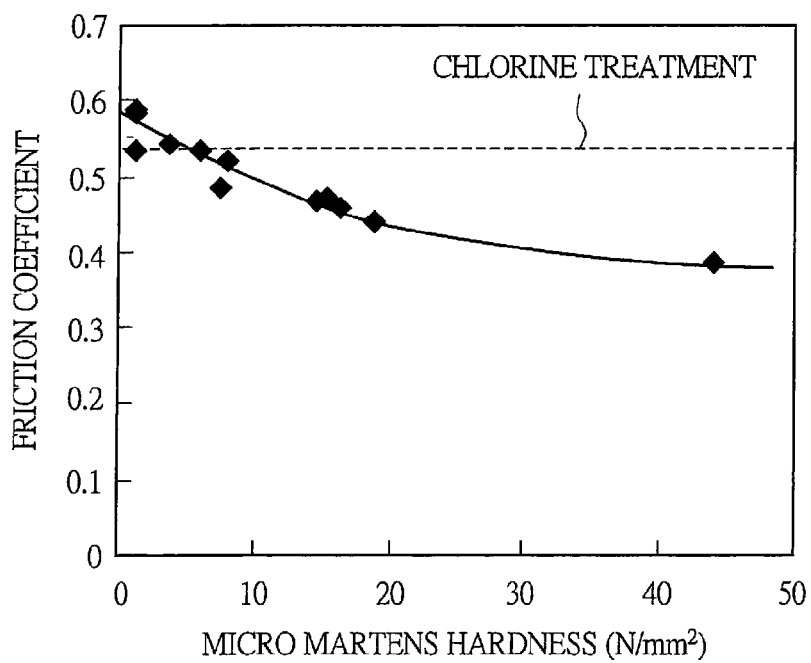
FIG. 10 is a graph illustrating a relationship between friction coefficient and micro Martens hardness in Experiment 3.

Sample width: 10 mm
Load: 15 gf
Sliding radius: 70 mm
Number of rotations: 173.5 rpm
Friction speed: 1.3 m/s
Temperature: 25° C.
Humidity: 70%
Partner material: glass plate As illustrated in FIG. 10, the friction coefficient tended to be decreased as increasing the micro Martens hardness. And, when the micro Martens hardness was 5 $N/mm^2$ or harder, the friction was lower than that in the case of the chlorine treatment. That is, it was found out that the friction can be reduced by the graft polymerization of HEMA by the electron beam irradiation to EPDM.

Experiment 4

Evaluation of Ozone Resistance

The blade-rubber molded bodies (rubber material A) molded from EPDM in the above-described Experiment 1 and other rubber materials B to E were retained under the following conditions, and their ozone resistances were evaluated by presence or absence of cracks.

Temperature: 40° C.
Ozone concentration of: 50 pphm
Tensile rate: 40%
Retention time: until generation of cracks (200 hours at longest)

As other rubber materials, the following materials were evaluated.

Rubber material B: a rubber material in which NR was used as the diene-based rubber instead of EPDM and whose surface was not treated Rubber material C: a NR rubber material which was vulcanized by sulfur Rubber material D: a rubber material in which the rubber material C was subjected to the chlorine treatment As results of the evaluation, in the rubber materials A and B, the cracks were not caused even after 200 hours. However, in the rubber materials C to E, the cracks were early caused after 2 to 4 hours. That is, it was found out that the rubber materials A and B manufactured by the method of manufacturing the blade rubber according to the present invention have the extremely-superior ozone resistance to the rubber materials C to E manufactured by different methods from the present invention.

Experiment 5

Comparison of Influence of Ethylene Content

Blade-rubber molded bodies were manufactured similarly to Experiment 1 with the following compositions of Nos. 1 to 5 whose EPDM or oil components were different from each other, and then, the blade-rubber molded bodies were cut to obtain the blade rubber.

No. 1
EPDM polymer: 20 phr of EP24 (manufactured by JSR Corporation, the same is used up to No. 3) and 80 phr of EP27;
Reinforcing agent: 40 phr of Asahi #60 (manufactured by Asahi Carbon Co., Ltd.) as FEF (Fast Extrusion Furnace);
Vulcanizing agent: 5 phr of Percumyl D-40 (manufactured by NOF Corporation) as peroxide (DCP);
Vulcanization accelerator auxiliary agent: 5 phr of mixture of two types of zinc oxides (manufactured by Sakai Chemical Industry Co., Ltd.) as zinc oxide and 1 phr of Lunac S-20 (manufactured by Kao Corporation) as stearic acid; and
Plasticizer: 10 phr of Diana Process Oil NR-26 (manufactured by Idemitsu Kosan Co., Ltd.) as naphthenic oil.

No. 2
The same as No. 1 except for using 20 phr of EP21 and 80 phr of EP107 as the EPDM polymer No. 3
The same as No. 1 except for using 100 phr of EP57F as the EPDM polymer No. 4
The same as No. 1 except for using 50 phr of EPT3072EH (manufactured by Mitsui Chemicals, Inc.) and 50 phr of EPT3045H as the EPDM polymer No. 5
The same as No. 4 except for using 10 phr of paraffin oil (Diana process oil PW-90) as the plasticizer (oil component)

For each obtained blade rubber, a modulus of tensile stress (%) based on JIS K2269 was measured from −20° C. to 20° C., and the low-temperature wiping performance was evaluated as follows. The result is shown in Tables 2 and 3 together with the compositions of Nos. 1 to 5, the ethylene content (mol %) of the EPDM polymer, and the oil fluid point (° C.)

of the oil component. Further, the temperature dependency of the tensile stress is illustrated in graphs of FIGS. 11A and 11B, and the blade rubbers after the evaluation of the low-temperature wiping performance are shown in pictures of FIG. 12. Note that their ethylene contents and oil fluid points have been excerpted from catalogs of their products. Here, the oil fluid points are generally measured based on JIS K6251.

(Evaluation Method of Low-Temperature Wiping Performance)

For each blade rubber, after the wiper blade illustrated in FIG. 1 is assembled, the wiping performance was evaluated at −20° C. based on JIS D5710, and almost no wiping unevenness is denoted by a symbol of "⊙", low wiping unevenness is denoted by a symbol of "○", and high wiping unevenness is denoted by a symbol of "Δ".

TABLE 2

| | | | COMPOSITION | | |
|---|---|---|---|---|---|
| | | | No. 1 | No. 2 | No. 3 |
| POLYMER | EPDM | EP24 | 20 | | |
| | | EP27 | 80 | | |
| | | EP21 | | 20 | |
| | | EP107 | | 80 | |
| | | EP57F | | | 100 |
| REINFORCING AGENT | FEF | ASAHI #60 | 40 | 40 | 40 |
| VULCANIZING AGENT | PEROXIDE (DCP) | PERCUMYL D-40 | 5 | 5 | 5 |
| VULCANIZATION ACCELERATOR AUXILIARY AGENT | ZINC OXIDE | TWO TYPES OF ZINC OXIDES | 5 | 5 | 5 |
| | STEARIC ACID | LUNAC S-20 | 1 | 1 | 1 |
| PLASTICIZER | NAPHTHENIC OIL | DIANA PROCESS OIL NR-26 | 10 | 10 | 10 |
| | PARAFFIN OIL | DIANA PROCESS OIL PW-90 | | | |
| ETHYLENE CONTENT (MOL %) | | | 54 | 62 | 66 |
| OIL FLUID POINT (° C.) | | | −45 | −45 | −45 |
| −20° C.→20° C. MODULUS OF TENSILE STRESS (%) | | | 131 | 167 | 223 |
| LOW-TEMPERATURE WIPING PERFORMANCE | | | ⊙ | ○ | Δ |

TABLE 3

| | | | COMPOSITION | |
|---|---|---|---|---|
| | | | No. 4 | No. 5 |
| POLYMER | EPDM | EPT3072EH | 50 | 50 |
| | | EPT3045H | 50 | 50 |
| REINFORCING AGENT | FEF | ASAHI #60 | 40 | 40 |
| VULCANIZING AGENT | PEROXIDE (DCP) | PERCUMYL D-40 | 5 | 5 |
| VULCANIZATION ACCELERATOR AUXILIARY AGENT | ZINC OXIDE | TWO TYPES OF ZINC OXIDES | 5 | 5 |
| | STEARIC ACID | LUNAC S-20 | 1 | 1 |
| PLASTICIZER | NAPHTHENIC OIL | DIANA PROCESS OIL NR-26 | 10 | |
| | PARAFFIN OIL | DIANA PROCESS OIL PW-90 | | 10 |

TABLE 3-continued

| | COMPOSITION | |
|---|---|---|
| | No. 4 | No. 5 |
| ETHYLENE CONTENT (MOL %) | 63 | 63 |
| OIL FLUID POINT (° C.) | −45 | −18 |
| −20° C.→20° C. MODULUS OF TENSILE STRESS (%) | 176 | 246 |
| LOW-TEMPERATURE WIPING PERFORMANCE | ⊙ | Δ |

Figure 11A:
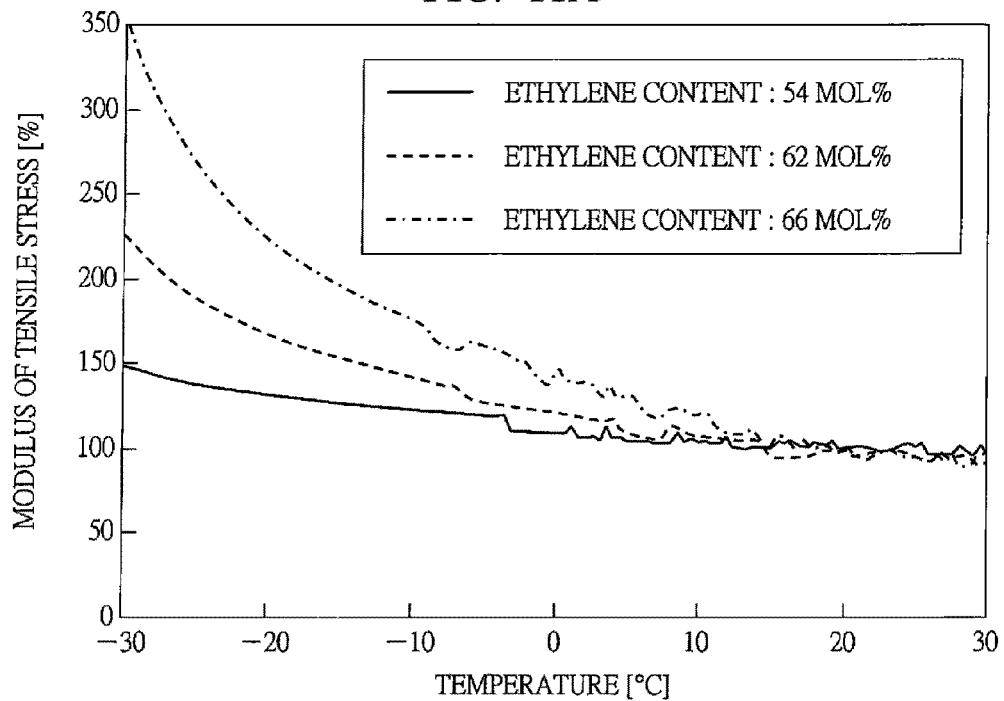
FIGS. 11A and 11B are graphs illustrating temperature dependency of tensile stress.

As shown in Table 2 and FIG. 11A, in Nos. 1 and 2 having the ethylene content of the EPDM polymer which is equal to or less than 62 mol %, the modulus of tensile stress from −20° C. to 20° C. could be suppressed to be 170% or lower. As a result, as shown in Table 2 and FIG. 12, the low-temperature wiping performance was good. Particularly, in No. 1 having the ethylene content which is equal to or less than 60 mol %, the modulus of tensile stress could be suppressed to be 160%, and therefore, the low-temperature wiping performance was superior. On the other hand, in No. 3 having the ethylene content of the EPDM polymer which is more than 62 mol %, the modulus of tensile stress from −20° C. to 20° C. was significantly over 200%, and therefore, the low-temperature wiping performance was not good, either. As described above, when the ethylene content of the EPDM polymer is 62 mol % or less, the low-temperature crystallization of the ethylene component is suppressed to cause good low-temperature wiping performance, and when the ethylene content thereof is 60 mol % or less, the effect is remarkable.

Figure 11B:
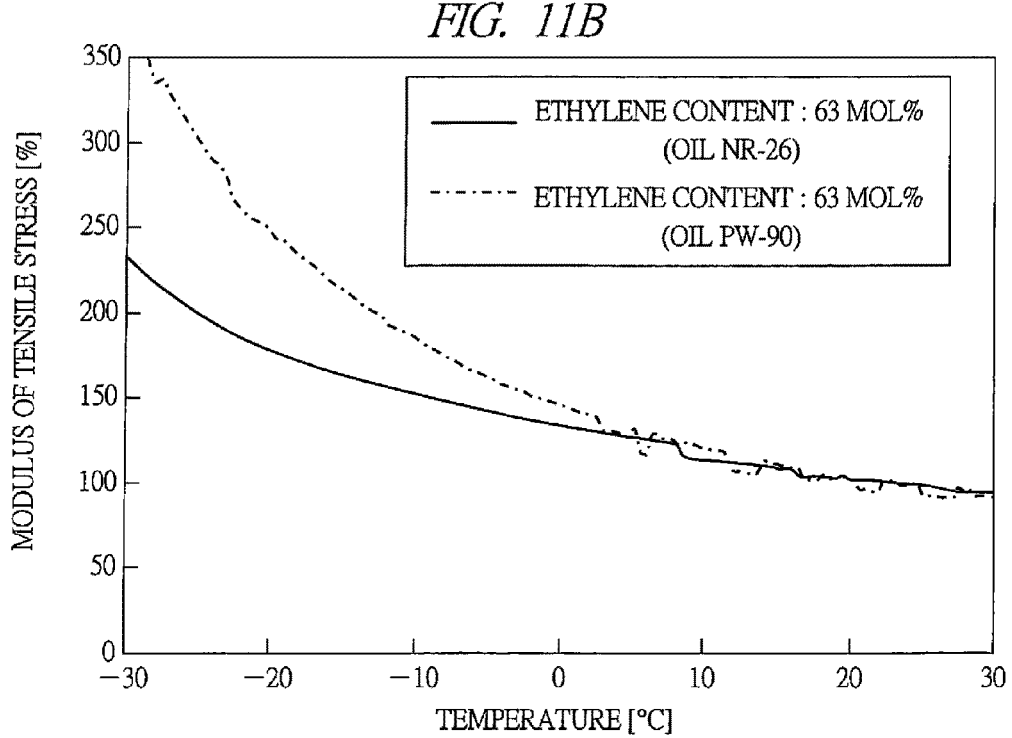

Further, as shown in Table 3 and FIG. 11B, in No. 4 using the oil component having the oil fluid point which is equal to or lower than −20° C., the modulus of tensile stress from −20° C. to 20° C. could be decreased by 70% lower than that of No. 5 using the oil component having the oil fluid point which is higher than −20° C. Accordingly, when the oil component having the oil fluid point which is equal to or lower than −20° C. is used, it was found out that the low-temperature solidification of the added oil component can be suppressed. Note that, as shown in Table 3 and FIG. 12, in spite of the fact that the ethylene content of the EPDM polymer is more than 62 mol % and the modulus of tensile stress is higher than 170% in No. 4, No. 4 has the superior low-temperature wiping performance. However, it is thought that the result was good because the rubber itself of the blade rubber of No. 4 was softer than those of other samples.

The present invention can be used for a blade rubber that is provided in a wiper blade for wiping a windshield of a vehicle.

What is claimed is:

1. A wiper blade for wiping a windshield of a vehicle, comprising:
a blade rubber comprising a head portion formed in a cross-sectional rectangular shape, a lip portion contacting a surface of a windshield of a vehicle, and a neck portion connecting the head portion with the lip portion, which are integrally formed with using a non-diene-based rubber selected from the group consisting of ethylene-propylene-diene terpolymer rubber (EPDM) and ethylene-propylene copolymer rubber (EPR) of which the content of ethylene polymer contained is 62 mol % or less; and
monomers adhered on a surface of the lip portion of the blade rubber and bound by graft polymerization at radical active sites formed on a surface of the blade rubber due to performing an irradiation treatment to the blade rubber.

2. A wiper blade for wiping a windshield of a vehicle, comprising:
- a blade rubber comprising a head portion formed in a cross-sectional rectangular shape, a lip portion contacting a surface of a windshield of a vehicle, and a neck portion connecting the head portion with the lip portion, which are integrally formed with using a non-diene-based rubber selected from the group consisting of ethylene-propylene-diene terpolymer rubber (EPDM) and ethylene-propylene copolymer rubber (EPR) of which the content of ethylene polymer contained is 62 mol % or less; and
- monomers adhered on both side surfaces of a surface of the lip portion of the blade rubber and simultaneously bound by graft polymerization at radical active sites formed on a surface of the blade rubber due to performing an irradiation treatment to the blade rubber.

3. The wiper blade according to claim 1, wherein the monomers are polymerizable monomers made of a hydrophobic material containing at least one of a vinyl group ($CH_2$=CH—), an isopropenyl group ($CH_2$=C($CH_3$)—), and an allyl group ($CH_2$=$CHCH_2$—) in molecules.

4. The wiper blade according to claim 1, wherein the monomers are polymerizable monomers made of a hydrophilic material containing at least one of 2-hydroxyethyl methacrylate (HEMA), 2-hydroxyethyl acrylate (HEA), glycidyl methacrylate (GMA), acrylamide, methacrylic acid, acrylic acid, and their metal salt.

5. The wiper blade according to claim 1, wherein the non-diene-based rubber is molded by peroxide crosslinking.

6. The wiper blade according to claim 1, wherein the Martens hardness of the surface of the lip portion is 5 $N/mm^2$ or harder.

7. The wiper blade according to claim 1, wherein the monomers are not adhered on a tip surface of the lip portion of the blade rubber.

8. The wiper blade according to claim 1, wherein a content of ethylene contained in the polymer of the ethylene-propylene-diene terpolymer rubber (EPDM) is 50 mol % or more and 60 mol % or less.

9. The wiper blade according to claim 1, wherein a modulus of tensile stress of the lip portion at an atmospheric temperature of −20° C. to 20° C. is 170% or lower.

10. The wiper blade according to claim 1, wherein a modulus of tensile stress of the lip portion at an atmospheric temperature of −20° C. to 20° C. is 100% or higher and 160% or lower.

11. The wiper blade according to claim 1, wherein oil is added, and a fluid point of the oil is −20° C. or lower.

12. The wiper blade according to claim 1, wherein oil is added, and a fluid point of the oil is −30° C. or lower.

13. The wiper blade according to claim 2, wherein the monomers are polymerizable monomers made of a hydrophobic material containing at least one of a vinyl group ($CH_2$=CH—), an isopropenyl group ($CH_2$=C($CH_3$)—), and an allyl group ($CH_2$=$CHCH_2$—) in molecules.

14. The wiper blade according to claim 2, wherein the monomers are polymerizable monomers made of a hydrophilic material containing at least one of 2-hydroxyethyl methacrylate (HEMA), 2-hydroxyethyl acrylate (HEA), glycidyl methacrylate (GMA), acrylamide, methacrylic acid, acrylic acid, and their metal salt.

15. The wiper blade according to claim 2, wherein the non-diene-based rubber is molded by peroxide crosslinking.

16. The wiper blade according to claim 2, wherein the Martens hardness of the surface of the lip portion is 5 $N/mm^2$ or harder.

17. The wiper blade according to claim 2, wherein the monomers are not adhered on a tip surface of the lip portion of the blade rubber.

18. The wiper blade according to claim 2, wherein a content of ethylene contained in the polymer of the ethylene-propylene-diene terpolymer rubber (EPDM) is 50 mol % or more and 60 mol % or less.

19. The wiper blade according to claim 2, wherein a modulus of tensile stress of the lip portion at an atmospheric temperature of −20° C. to 20° C. is 170% or lower.

20. The wiper blade according to claim 2, wherein a modulus of tensile stress of the lip portion at an atmospheric temperature of −20° C. to 20° C. is 100% or higher and 160% or lower.

21. The wiper blade according to claim 2, wherein oil is added, and a fluid point of the oil is −20° C. or lower.

22. The wiper blade according to claim 2, wherein oil is added, and a fluid point of the oil is −30° C. or lower.

* * * * *